United States Patent [19]

Gasson

[11] 4,257,756
[45] Mar. 24, 1981

[54] APPARATUS FOR FORMING SHAPED ARTICLES

[75] Inventor: Roy A. Gasson, Crawley, England

[73] Assignee: Redifon Flight Simulation Limited, Crawley, England

[21] Appl. No.: 936,617

[22] Filed: Aug. 24, 1978

Related U.S. Application Data

[62] Division of Ser. No. 769,883, Feb. 23, 1977, Pat. No. 4,139,586.

[30] Foreign Application Priority Data

Mar. 3, 1976 [GB] United Kingdom ............... 8465/76

[51] Int. Cl.³ .............................................. B29C 17/04
[52] U.S. Cl. .................................... 425/384; 425/74; 425/387.1; 425/388
[58] Field of Search ..................... 425/384, 387.1, 388, 425/73, 74; 264/544, 553, 547

[56] References Cited

U.S. PATENT DOCUMENTS

| 2,931,064 | 4/1960 | Matoba ................................. 425/388 |
| 3,007,206 | 11/1961 | Griswold ........................ 425/387.1 X |
| 3,482,281 | 12/1969 | Thiel ................................. 425/388 X |
| 3,529,458 | 9/1970 | Butler et al. .................. 425/387.1 X |

FOREIGN PATENT DOCUMENTS 1168055  4/1964  Fed. Rep. of Germany ........... 425/388

*Primary Examiner*—Jan H. Silbaugh
*Attorney, Agent, or Firm*—Larson, Taylor and Hinds

[57] ABSTRACT

An apparatus provided for forming articles from thermoplastics sheet by free-blowing, without use of moulds, in which the sheet is pre-heated to elastic state, free-blown by establishing a differential fluid pressure between opposite faces of the sheet and maintained at optimum temperature during the period of free-blowing by heating or cooling by heat-exchange between the sheet and fluid flowing over at least one face. The apparatus comprises a tank divisible into two halves adapted to hold the sheet edgewise in between, the differential fluid pressures being established between the volumes in the two halves and fluid flow over the face of the sheet being established in one half.

4 Claims, 2 Drawing Figures

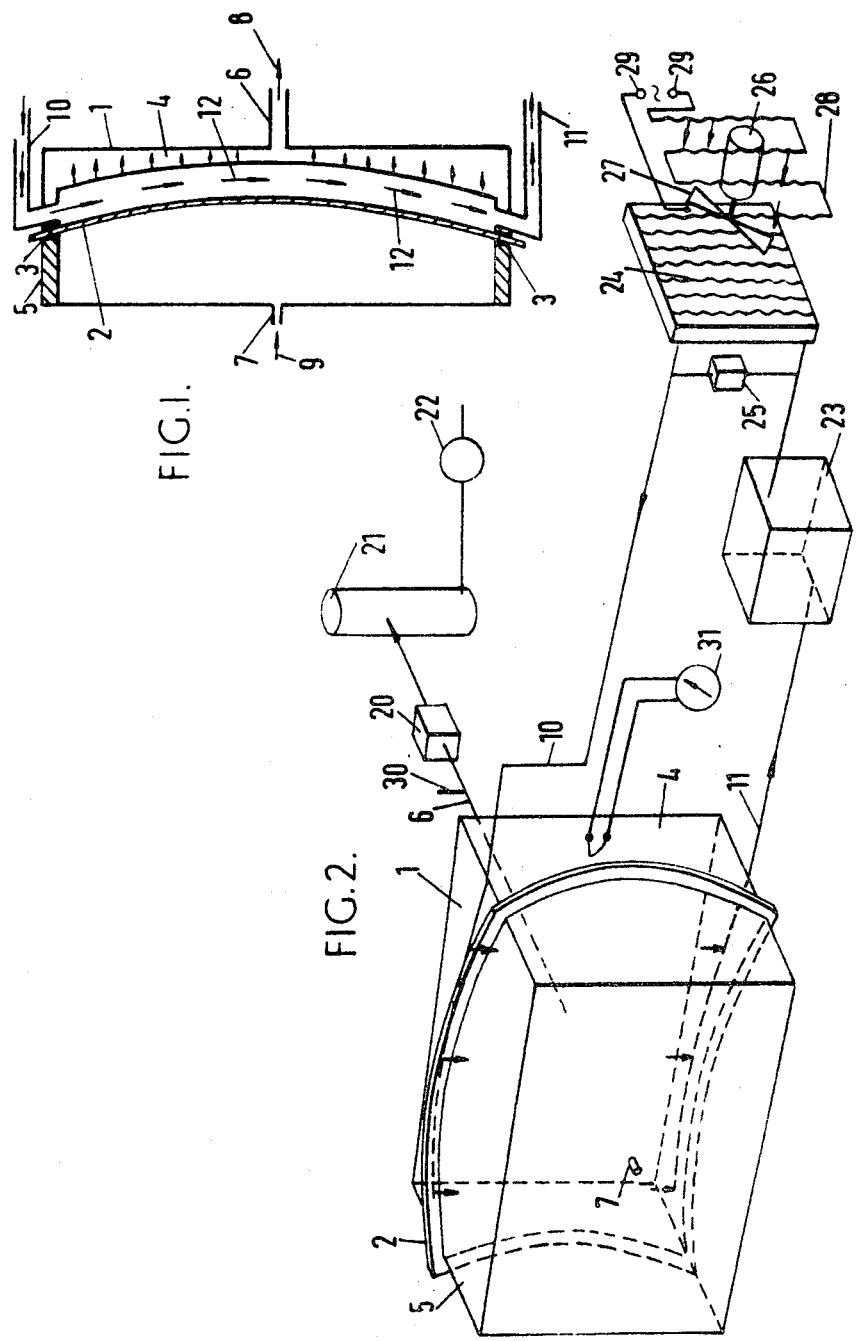

APPARATUS FOR FORMING SHAPED ARTICLES

This is a division of application Ser. No. 769,883 filed Feb. 23, 1977, now U.S. Pat. No. 4,139,586 issued Feb. 13, 1979.

This invention relates to apparatus for forming shaped articles by the method known as free-blowing.

It is well-known to form shaped articles by securing a sheet of thermoplastic material in a surround, heating the sheet to bring the sheet to an elastic state and forming the shape fo the sheet by applying a differential fluid pressure between the sheet faces. Most usually, air pressure is applied and most conveniently a partial vacuum is formed adjacent one face of the sheet. In particular cases, the sheet may be vacuum-formed over a shaped mould. If no such mould is used, however the sheet becomes free-blown, taking up a shape within the surround defined by the minimum surface area, in analagous manner to a soap bubble. Consequently, the free-blown surface tends to spherical shape, the area most remote from the clamp surround approximating most accurately to the spherical.

The method is one of great simplicity, when using thin sheet, small sheet size and approximate shaping. However, the present invention is concerned with large mouldings of sufficient thickness to provide good mechanical rigidity of the moulded article when cooled and of optical accuracy of final surface configuration.

In a particular application, the invention is concerned to provide free-blown forms of thermoplastics material able to carry a mirror surface and suitable for optical, near infra-red and radio frequency use.

The object of the invention is to provide improved apparatus for producing moulded forms, particularly free-blown forms.

Accordingly, one form of the invention provides apparatus for moulding a hot thermoplastic sheet by differential fluid pressure between the two faces of the sheet, comprising a tank constructed to contain a volume of fluid under pressure, either positive or negative pressure with respect to atmospheric pressure, said tank being adapted to receive and retain the hot thermoplastic sheet in such manner that the sheet divides the tan volume into two isolated parts, in the manner of a membrane therebetween, one volume part on each side of the sheet, first fluid vents for providing a differential pressure between the two volume parts of the tank, second fluid vents for providing a flow of fluid through at least one said volume part of the tank and means for heating the flowing fluid to such temperature that it selectively imparts or withdraws heat from the said thermoplastics sheet membrane while flowing through the said tank volume part.

Conveniently, the fluid used is air, one of said first vents freely vents to the atmosphere the first of the volume parts of the tank and the other one of said first vents maintains the other volume part of the tank at partial vacuum pressure. One of said second vents admits air of controlled temperature to the partial vacuum tank part and the second of said second vents withdraws air therefrom.

In a preferred form of the apparatus, the volume part of the tank at atmospheric pressure is partially filled with a male form, generally of the same shape as the thermoplastics sheet when finally free-blown and the vacuum part of the tank is partially filled with a female shape generally of the same shape. The sheet, when being free-blown touches neither form, the purpose being to reduce the air volumes and not to mould the sheet to their shape by contact therewith.

The female form has a finely perforated surface to permit of diffusion of air therethrough and thus the exhaust vent of said first vents contributes a uniform amount over the female form, to the flow of air controlled by the said second vents. In such manner, a substantially laminar air flow past the convex free-blown sheet face may be established.

In a forming method using the apparatus according to the invention for forming a thermoplastics sheet, the sheet is heated in an oven to a uniform temperature at which the sheet acquires elastic properties, in suitable apparatus, a differential fluid pressure is established between the two faces of the sheet to effect free-blowing thereof and, at the same time, fluid is permitted to flow past at least one face of the sheet for the purpose of controlling the temperature thereof, by supplying heat thereto or withdrawing heat therefrom, for a required time and thereafter the formed sheet is cooled to a temperature at which it acquires rigid properties.

Preferably, the rate of cooling is controlled, by the fluid flow past the face of the sheet, during the cooling part of the operation.

In order that the invention may be fully understood and readily carried into practice, one embodiment of the apparatus and method thereof will now be described in detail, by way of example, with reference to the accompanying drawings, in which:

FIG. 1 is a diagram showing in cross section a vacuum tank apparatus for free-blowing thermoplastics sheet, and FIG. 2 is an isometric diagram showing external apparatus associated with the vacuum tank of FIG. 1.

In the drawings, the same elements are indicated by the same reference numerals in both figures.

FIG. 1 shows in cross-section view a tank 1 adapted to receive rectangular sheets 2 of thermoplastics material of some 3.7 by 2.4 meters dimension secured within the tank 1 by surrounding clamps 3, so that the sheet 2 constitutes a membrane dividing the volume of the tank 1 into two isolated parts.

A low pressure part, shown at the right in FIG. 1, is constituted by a movable female form member 4 within the tank wall and of air-permeable construction. This part of the tank is connected by a vent 6 to an air exhausting system, as indicated by the arrow 8.

The high pressure part of tank 1, shown at the left in FIG. 1, is constituted by a movable hollow member 5, which is vented to the atmosphere at a vent 7, as indicated by the arrow 9.

Air flow, past the low pressure face of sheet 2, is effected by air admitted at vent 10 and removed at vent 11, as shown by the series of arrows 12.

Referring now to FIG. 2, the exhaust vent 6 is shown connected, by way of a vacuum control valve 20, to a reservoir 21 which is maintained at partial vacuum pressure by a vacuum pump 22.

Vents 10 and 11 of FIG. 1 are shown in FIG. 2 as being part of an essentially closed air circulating circuit. Vent 11 carries air exhausted from tank 1 by air pump 23 and pumped through either a finned heat-exchanger 24 or through a valve-controlled by-pass branch 25, to be returned to tank 1 by way of vent 10. A motor 26 drives fan blades 27 to provide a current of air through an electric resistance heater 28 through the heat exchanger 24. When the heater 28 is inoperative, cold air flows past the fins of heat exchanger 24 to cool the circulating air in the closed circuit. When the heater 28 is energised by a supply at terminals 29, hot air is blown through the heat exchanger to heat the air in the closed circuit. A preset bleed pipe 30 is supplied to prevent air from the closed circuit, which is lost by diffusion through the form 4, FIG. 1, and exhausted from the tank by way of vent 6, from exceeding a maximum flow valve for any chosen depth of draw and chosen thickness of sheet 2.

The underlying principles of the invention will now be explained, together with one example of the method of the invention which is applied in this instance, to the manufacture of large plastics forms, of accurate and consistent surface shape which, when surface coated to provide a reflecting surface, may be used for direct viewing, by a plurality of observers, to provide a collimated visual display.

The basis of the method is that a large sheet of thermoplastic material, dimensioned some 3.5 meters wide by 2.5 meters high by 12 mm thick, is heated in an oven to a temperature at which the plastics material has elastic properties, for methyl methacrylate some 150° C. While still hot, the plastics sheet, held in surrounding clamps of the required final marginal shape, is subjected to a differential fluid pressure between its two faces, so causing it to be "free-blown," or "free-sucked," into a shape approaching part-spherical. When the correct surface curvature has been obtained, the sheet is cooled to form a rigid shell.

The present method is not concerned with any subsequent surface cleaning, polishing, hardening or coating of the shell, or mounting of the resultant mirror.

The sheet, where held by the surrounding clamp, will of course take up the shape of the clamp over the marginal area held. When subjected to differential fluid pressure upon its two faces, the sheet will take up a "least-area" shape, the curvature depending upon the pressure difference applied. An unsupported, continuous envelope would assume spherical shape. A sheet, marginally supported in clamps, assumes a transitional shape from the clamp shape, immediately adjacent the clamp-held margin, to near-spherical in the area most remote from the clamps. If the transition is to be smooth, the physical characteristics of the sheet must be homogeneous throughout, that is temperature gradients across the face surface and through the sheet thickness must be minimal.

For repetitive manufacture, not only is the regular surface shape of each shell of importance but also the consistency of shape between successive shells. Because the plastics material has an elastic memory the requirement of uniformity necessitates uniform cooling of every moulding regardless of any change of ambient conditions.

These requirements are substantially met, according to the invention, by maintaining a flow of fluid over at least one face of the sheet, both during blowing and during cooling, and controlling the temperature of the flowing fluid for the purpose of supplying heat to or withdrawing heat from the sheet during blowing and cooling.

In the method now particularly described, a differential air pressure is maintained by venting one face of the sheet freely to the atmosphere and maintaining a partial vacuum on the other. A flow of air of controlled temperature is maintained over the convex face on the partial vacuum side.

Referring again to the drawings, the plastics sheet 2, after heating in an oven, is mounted in the clamp surround 3 and positioned between the demountable halves 4 and 5 of the tank 1. When the tank 1 is reassembled, the sheet 2 forms a diaphragm separating the two volume parts of the tank 1.

Air is withdrawn from the low-pressure part at vent 6, causing sheet 2 to bow towards form 4. Vent 7 permits atmospheric pressure to be maintained on the high-pressure face of sheet 2.

The residual air in the low pressure volume part is temperature-controlled and circulated to flow over the convex face of sheet 2.

The heat exchanger 24 is supplied by fan 27 with cool atmospheric air or with hot air heated by heater 28, as required to cool or heat the plastics sheet 2.

Remote-indicating thermometers, represented in FIG. 2 by the sole thermometer 31, and optical measuring instruments, not shown, are provided to monitor the temperature and surface curvature, respectively, of the sheet 2. Fine control of the circulating air effect is achieved by control of the by-pass valve 25. As diagrammatically shown in FIG. 2, multiple inlet vents 10' are provided above the level of sheet 2 and multiple exhaust vents 11' below, so that substantially laminar air flow downwardly over the entire convex face of sheet 2 can be achieved.

More particularly, with reference to FIG. 1, the air inlet vents 10 along the top of the sheet 2 are provided to establish, from above the sheet 2, a uniform body of downwardly-moving air. Further, in the absence of sheet 2, the arrangement is such as to establish a Coanda effect at the surface of form 4, by air diffusion into the surface of the form 4. This feature permits air flow to occur before the demountable parts are closed upon an unformed plastics sheet, thereby preventing interference with the initial free-blowing stage.

The exhaust vents 11 look into the low fluid resistance of pump 23, whereas the inlet vents 10 provide a higher fluid resistance to the pump 23. The inlet vents 10 are consequently always operated under "choked flow" conditions.

As the sheet 2 is bowed to the required (measured) surface curvature, the resultant diaphragm within the tank 1 establishes always a constant volume, and cross-section, of the low-pressure volume part. Thus, a uniform pressure differential between vents 10 and vents 11 provides a repeatable rate of air-change within the low-pressure volume part of tank 1. This rate of change requires a linear air velocity, downwardly of the sheet face, greater than the critical Reynolds number at which transition flow behaviour occurs. Predictable, repeatable air flow is thus established for successive moulding operations.

During the cooling process for the formed sheet 2, it is necessary to control the rate of cooling of the sheet 2 in a repeatable manner for successive moulding operations. The required rate of cooling depends in part upon the physical characteristics of the plastics material under the surface strain which corresponds to the required bowed shape and is also dependent upon the change of shape of the sheet which occurs between its forming temperature and its cooled temperature. The required rate of cooling, and the required changes of rate of cooling during the cooling regime, can thus be ascertained either by calculation or empirically. The adherence of instantaneous temperature to that required during the cooling regime is continuously monitored by thermometers 31.

I claim:

1. Apparatus for forming a shaped article by free-blowing a hot thermoplastics sheet, comprising a tank constructed to contain a volume of fluid and including clamp means for retaining the hot thermoplastic sheet around the edge thereof in such manner that the sheet divides the tank volume into first and second tank volume parts which are isolated from each other by the said sheet in the manner of a membrane therebetween; and first fluid vent means for connecting one only of said first and second tank volume parts to a fluid flow circuit, said fluid flow circuit also including fluid pump means and means for selectively heating and cooling fluid flowing in said fluid flow circuit to such temperatures that said flowing fluid selectively imparts heat to or withdraws heat from the said thermoplastic sheet while flowing through said one tank volume part, the said apparatus further comprising second vent means for connecting said first and second tank volume parts to fluid volumes at different relative pressures so as to maintain said differential fluid pressure between the two faces of said thermoplastic sheet such that said sheet, apart from said edge thereof, is maintained in spaced relationship relative to the remainder of the apparatus during free-blowing, said apparatus further comprising a male form which partially fills the said first volume part of the tank, said male form being generally of the same shape as the thermoplastic sheet when finally free-blown, said apparatus further comprising a female form which partially fills the said second volume part of the tank and which is generally of the same shape, the shaped surfaces of the said forms facing the area of the tank occupied by the thermoplastic sheet and being so arranged that the sheet, when being free-blown, touches the face of neither form.

2. Apparatus as claimed in claim 1, in which the fluid providing said differential pressure and the fluid providing said fluid flow is air, and said second vent means comprising a vent for freely venting said first tank volume part to the atmosphere and a reservoir maintained at partial vacuum pressure connected through a further vent to said second volume part of the tank.

3. Apparatus as claimed in claim 1, in which the female form includes a finely perforated surface which permits diffusion of air therethrough from said second volume part of the tank to said further vent of said second vent means.

4. Apparatus for forming a shaped article by free-blowing a hot thermoplastics sheet, comprising a tank constructed to contain a volume of fluid and including clamp means for retaining the hot thermoplastic sheet around the edge thereof in such a manner that the sheet divides the tank volume into first and second tank volume parts which are isolated from each other by the said sheet in the manner of a membrane therebetween; and first fluid vent means for connecting one only of said first and second tank volume parts to a fluid flow circuit including a fluid inlet port disposed adjacent one edge of the thermoplastic sheet and a fluid outlet port disposed adjacent the opposite edge of said sheet, for setting up a continuous fluid flow between said ports and thus across the entire face of said thermoplastic sheet, said fluid flow circuit also including fluid pump means and means for selectively heating and cooling fluid flowing in said fluid flow circuit to such temperatures that said flowing fluid selectively imparts heat to or withdraws heat from the said thermoplastic sheet while flowing through said one tank volume part, the said apparatus further comprising second vent means for connecting said first and second tank volume parts to fluid volumes at different relative pressures so as to maintain said differential fluid pressure between the two faces of said thermoplastic sheet such that said sheet, apart from said edge thereof, is maintained in spaced relationship relative to the remainder of the apparatus during free-blowing.

* * * * *